United States Patent
McGrew et al.

(10) Patent No.: US 11,394,728 B2
(45) Date of Patent: *Jul. 19, 2022

(54) ASSOCIATING A USER IDENTIFIER DETECTED FROM WEB TRAFFIC WITH A CLIENT ADDRESS

(71) Applicant: Cisco Technology, Inc., San Jose, CA (US)

(72) Inventors: David McGrew, Poolesville, MD (US); Blake Harrell Anderson, San Jose, CA (US); Ivan Nikolaev, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 367 days.

This patent is subject to a terminal disclaimer.

(21) Appl. No.: 16/432,400

(22) Filed: Jun. 5, 2019

(65) Prior Publication Data
US 2019/0312893 A1 Oct. 10, 2019

Related U.S. Application Data

(63) Continuation of application No. 15/399,003, filed on Jan. 5, 2017, now Pat. No. 10,348,745.

(51) Int. Cl.
*G06F 21/55* (2013.01)
*H04L 29/06* (2006.01)
(Continued)

(52) U.S. Cl.
CPC ...... *H04L 63/1416* (2013.01); *H04L 63/1425* (2013.01); *H04L 67/02* (2013.01);
(Continued)

(58) Field of Classification Search
CPC . H04L 63/14; H04L 63/1416; H04L 63/1425; H04L 67/02; H04L 67/22;
(Continued)

(56) References Cited

U.S. PATENT DOCUMENTS 6,297,819 B1 10/2001 Furst
8,843,514 B1 9/2014 Moonka et al.
(Continued)

FOREIGN PATENT DOCUMENTS

CN 105721629 A 6/2016
JP 2009223749 A 10/2009

OTHER PUBLICATIONS

"Cisco Identity Services Engine", http://www.cisco.com/c/en/us/products/security/identity-services-engine/index.html, 12 pages, Accessed Oct. 25, 2016, Cisco.

*Primary Examiner* — Izunna Okeke
(74) *Attorney, Agent, or Firm* — Behmke Innovation Group LLC; James M. Behmke; Jonathon P. Western

(57) ABSTRACT

In one embodiment, a device in a network receives a set of known user identifiers used in the network. The device receives web traffic log data regarding web traffic in the network. The web traffic log data includes header information captured from the web traffic and a plurality of client addresses associated with the web traffic. The device detects a particular one of the set of known user identifiers in the header information captured from the web traffic associated with a particular one of the plurality of client addresses. The device makes an association between the particular detected user identifier and the particular client address.

16 Claims, 6 Drawing Sheets

(51) Int. Cl.
*H04L 9/40* (2022.01)
*H04L 67/02* (2022.01)
*H04L 67/50* (2022.01)
*H04L 69/00* (2022.01)
H04L 61/4523 (2022.01)
H04L 101/365 (2022.01)
H04W 12/72 (2021.01)

(52) U.S. Cl.
CPC .............. *H04L 67/22* (2013.01); *H04L 69/02* (2013.01); *H04L 61/1523* (2013.01); *H04L 61/3065* (2013.01); *H04W 12/72* (2021.01)

(58) Field of Classification Search
CPC ..... H04L 69/02; H04L 61/1523; G06F 21/55; G06F 21/30
USPC ............... 726/2, 5, 23, 22, 27; 713/168, 182
See application file for complete search history.

(56) References Cited

U.S. PATENT DOCUMENTS

| | | | | |
|---|---|---|---|---|
| 2007/0064617 | A1* | 3/2007 | Reves | H04L 63/14 370/252 |
| 2010/0281527 | A1* | 11/2010 | John | H04L 67/22 726/7 |
| 2011/0283140 | A1* | 11/2011 | Stevens | H04L 43/50 714/27 |
| 2014/0089499 | A1 | 3/2014 | Zao | |

* cited by examiner

ASSOCIATING A USER IDENTIFIER DETECTED FROM WEB TRAFFIC WITH A CLIENT ADDRESS

TECHNICAL FIELD

The present application is a continuation of U.S. patent application Ser. No. 15/399,003, filed Jan. 5, 2017, entitled ASSOCIATING A USER IDENTIFIER DETECTED FROM WEB TRAFFIC WITH A CLIENT ADDRESS, by David McGrew et al., the contents of which are incorporated herein by reference.

TECHNICAL FIELD

The present disclosure relates generally to computer networks, and, more particularly, to associating a user identifier detected from web traffic with a client address.

BACKGROUND

Various types of security threats exist in modern computer networks. Such threats range from data exfiltration (e.g., an unauthorized entity gaining access to sensitive information, etc.), to attacks that disrupt the functioning of the network itself, to other forms of threats. In many cases, network security threats stem from malware present in the local network or the exploitation of vulnerabilities in the software deployed in the network. Protecting against these conditions is particularly challenging in the case of new types of malware and previously unknown software vulnerabilities, as in the case of zero-day attacks.

Behavioral analytics is a promising new field of networking security that looks to the observed behaviors in the network to identify potentially malicious conditions. For example, if a client device in the network is typically inactive at night, but suddenly starts uploading a large amount of data externally at 3:00 AM, this may indicate that data exfiltration is taking place.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network receives a set of known user identifiers used in the network. The device receives web traffic log data regarding web traffic in the network. The web traffic log data includes header information captured from the web traffic and a plurality of client addresses associated with the web traffic. The device detects a particular one of the set of known user identifiers in the header information captured from the web traffic associated with a particular one of the plurality of client addresses. The device makes an association between the particular detected user identifier and the particular client address.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
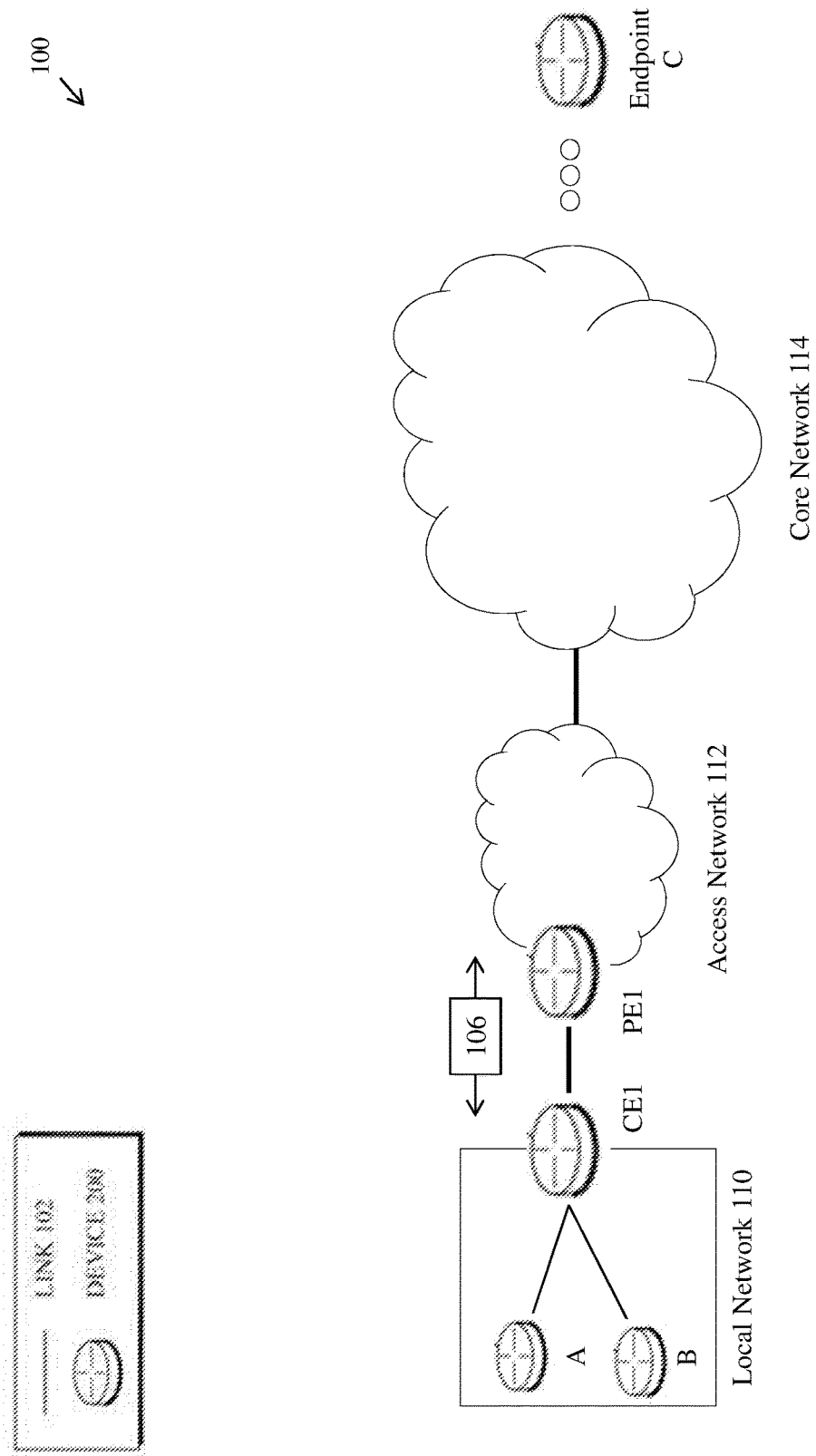
FIG. 1 illustrates an example communication network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of communication network 100. In other words, communication network 100 may also include any number of intermediary networking devices such as, but not limited to, routers, switches, firewalls, etc., that are not shown.

In various embodiments, nodes/devices 200 may employ a secure communication mechanism, to encrypt and decrypt data packets 106. For example, nodes/devices 200 shown may use a Transport Layer Security (TLS) mechanism, such as the HTTP Secure (HTTPS) protocol, to encrypt and decrypt data packets 106.

Figure 2:
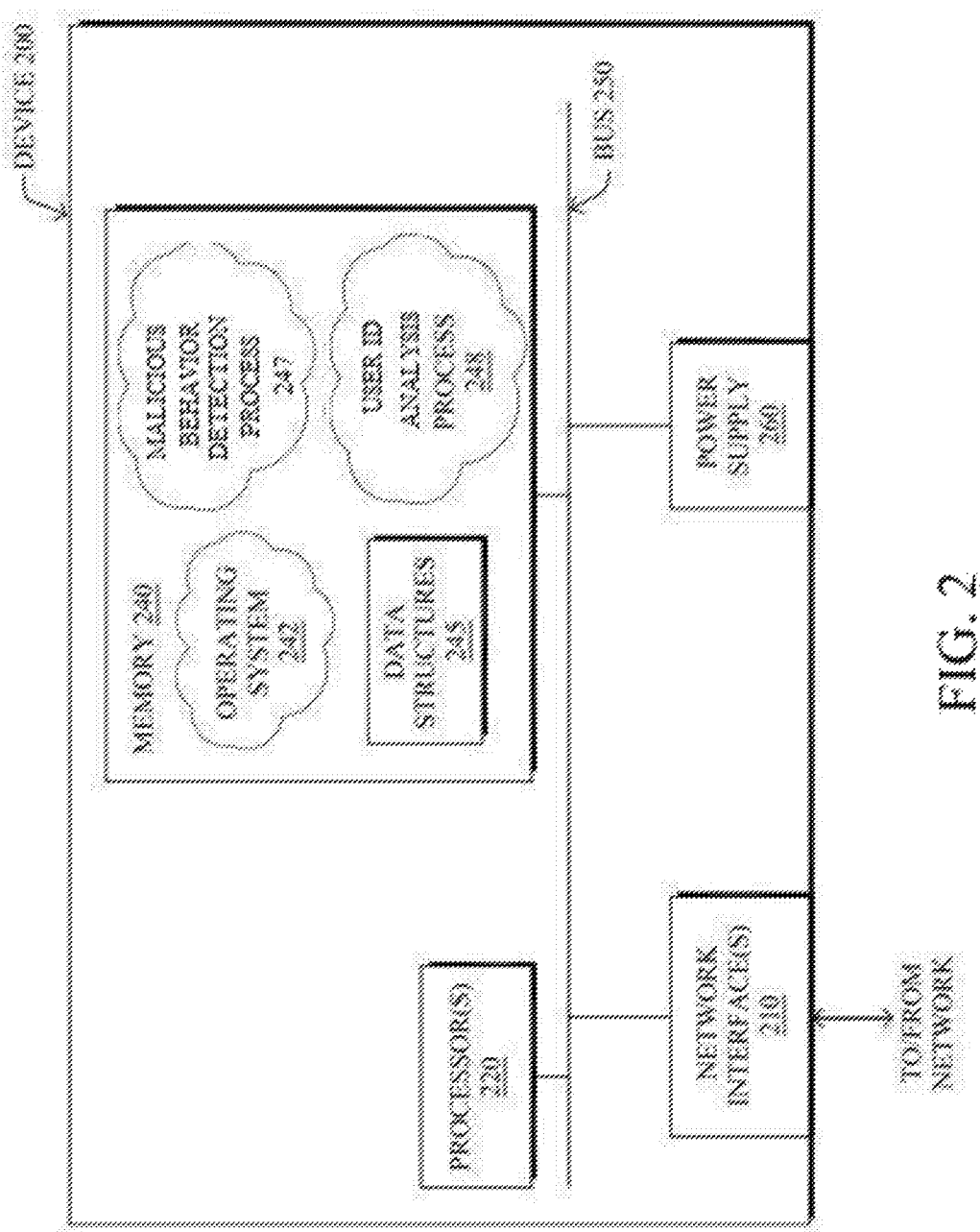
FIG. 2 illustrates an example network device/node.

FIG. 2 is a schematic block diagram of an example node/device 200 that may be used with one or more embodiments described herein, e.g., as any of the computing devices shown in FIG. 1, any other computing device that supports the operations of network 100 (e.g., switches, etc.), or any of the other devices referenced below. The device 200 may also be any other suitable type of device depending upon the type of network architecture in place. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a malicious behavior detection process 247 and/or a user identifier (ID) analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, malicious behavior detection process 247 may employ machine learning and/or detection rules, to detect the presence of malicious behavior in the network (e.g., the presence of malware, the exploitation of a software vulnerability, etc.). For example, malicious behavior detection process 247 may classify traffic in the network (and its corresponding application or client node) as being either benign or malicious. In one embodiment, malicious behavior detection process 247 may assess captured traffic data to determine whether a given traffic flow or set of flows are caused by malware in the network, such as a particular family of malware applications. This captured traffic data may include, but is not limited to, information about the packet flows in the network, such as the source and destination addresses of the flows, the network protocol(s) in use by the flows, the source and destination ports (e.g., TCP, UDP, or SCTP) of the flows, the number of bytes sent in the flows, and the like.

Example forms of traffic that can be caused by malware may include, but are not limited to, traffic flows reporting exfiltrated data to a remote entity, spyware or ransomware-related flows, command and control (C&C) traffic that oversees the operation of the deployed malware, traffic that is part of a network attack, such as a zero day attack or denial of service (DoS) attack, combinations thereof, or the like. In further embodiments, malicious behavior detection process 247 may classify the gathered traffic data to detect other anomalous behaviors (e.g., malfunctioning devices, misconfigured devices, etc.), traffic pattern changes (e.g., a group of hosts begin sending significantly more or less traffic), or the like.

Malicious behavior detection process 247 may employ any number of machine learning techniques to assess the gathered traffic data. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, malicious behavior detection process 247 can use the model M to classify new data points, such as information regarding new traffic flows in the network. Often, M is a statistical model, and the cost function is inversely proportional to the likelihood of M, given the input data.

In various embodiments, malicious behavior detection process 247 may employ one or more supervised, unsupervised, or semi-supervised machine learning models. Generally, supervised learning entails the use of a training set of data, as noted above, that is used to train the model to apply labels to the input data. For example, the training data may include sample traffic data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that malicious behavior detection process 247 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, autoencoders, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, malicious behavior detection process 247 may assess the captured traffic data on a per-flow basis. In other embodiments, malicious behavior detection process 247 may assess traffic data for a plurality of traffic flows based on any number of different conditions. For example, traffic flows may be grouped based on their sources, destinations, temporal characteristics (e.g., flows that occur around the same time, etc.), whether the flows are part of the same session, combinations thereof, or based on any other set of flow characteristics.

As noted above, behavioral analytics can be used effectively to detect malicious, and often previously unknown, conditions in a network. However, this analysis is often agnostic to the actual users operating the actual client devices being protected. When monitoring a network, it may be valuable to know the identity of the user associated with a given device. That is, it may be valuable to know that a particular network address is associated with a particular user identifier (e.g., a username, etc.). By doing so, behavioral analytics can then be applied on a per-user basis (e.g., to detect behavioral changes in the network that deviate from those expected for the particular user, etc.). Having knowledge of the actual user associated with a given client also allows the system to send notifications to the user, such as when the system determines that the user's device has been infected with malware.

Associating a User ID Detected from Web Traffic with a Client Address

The techniques herein allow for the association of known user IDs in a network to endpoint client devices in the network through the observation of web traffic in the network. In some aspects, the techniques may assess the HTTP header information of the web traffic associated with a particular client address, to match a known user ID in the header information to the address. Such information can then be used to enhance the operations of a malicious behavior detection system (e.g., by modeling network traffic behaviors on a per-user basis, etc.).

Specifically, according to one or more embodiments of the disclosure as described in detail below, a device in a network receives a set of known user identifiers used in the network. The device receives web traffic log data regarding web traffic in the network. The web traffic log data includes header information captured from the web traffic and a plurality of client addresses associated with the web traffic. The device detects a particular one of the set of known user identifiers in the header information captured from the web traffic associated with a particular one of the plurality of client addresses. The device makes an association between the particular detected user identifier and the particular client address.

Illustratively, the techniques described herein may be performed by hardware, software, and/or firmware, such as in accordance with the user ID analysis process 248, which may include computer executable instructions executed by the processor 220 to perform functions relating to the techniques described herein, e.g., in conjunction with malicious behavior detection process 247.

Operationally, as noted, the techniques herein introduce an approach for determining the user ID associated with an address that is based on the analysis of HTTP headers in web traffic for the address. This approach to user identification relies on network monitoring and requires only a minimal amount of effort to implement and configure in a network.

Figure 3A:
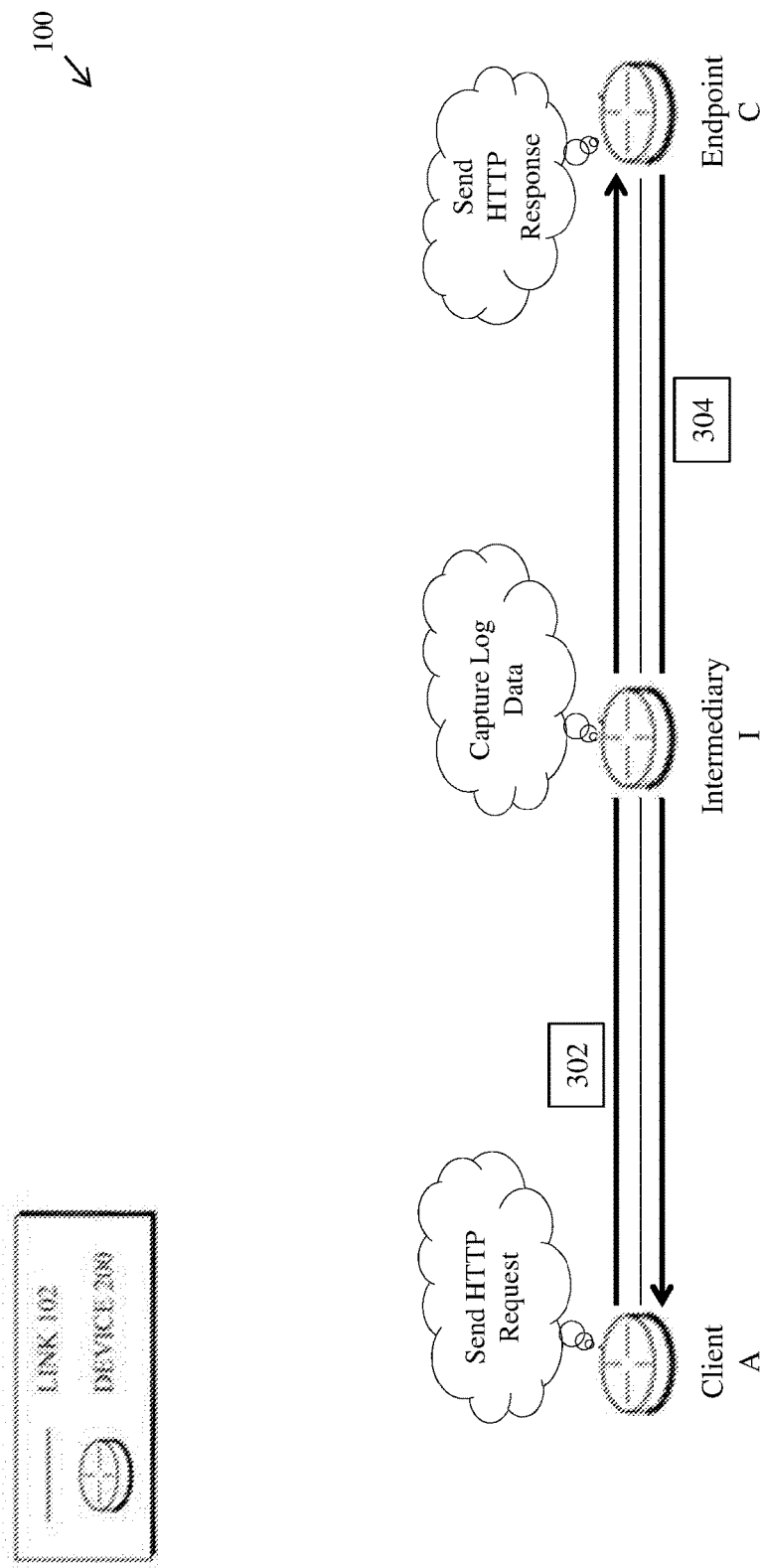
FIGS. 3A-3B illustrate an example of associating a user identifier from web traffic with a client address to detect malicious behavior in a network.
Figure 3B:
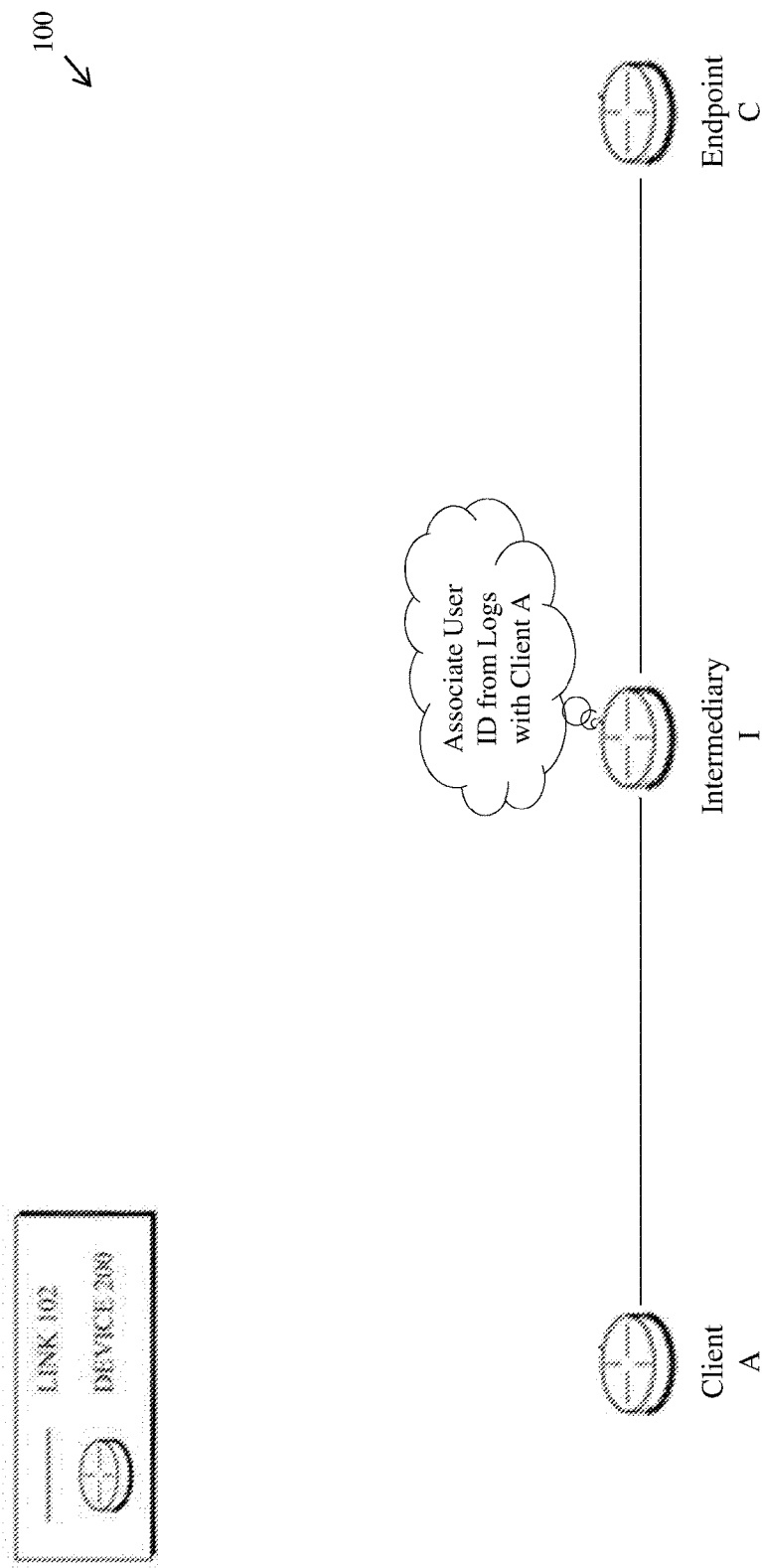

FIGS. 3A-3B illustrate an example of associating a user identifier from web traffic with a client address to detect malicious behavior in a network, according to various embodiments. As shown in FIG. 3A, network 100 may include an endpoint client node/device A, an endpoint node/device C (e.g., a server), as well as an intermediary node/device I located therebetween.

In general, intermediary device I may be any form of networking device that is located along the communication path between client A and endpoint C. For example, the intermediary device I may be, but is not limited to, a router, switch, firewall, intrusion detection system (IDS), intrusion prevention system (IPS), proxy server, or other networking device through which traffic exchanged between nodes/device A and C may flow. Intermediary device I may further be located in the local network of client A (e.g., local network 110) or, alternatively, as part of an external mechanism, such as a cloud-based service.

Web traffic exchanged between client A and endpoint C may comprise HTTP requests 302 sent from client A to endpoint C and/or HTTP responses 304 sent in response from endpoint C to client A. In various embodiments, intermediary device I may capture HTTP log data regarding this web traffic. For example, if intermediary device I acts as an HTTP proxy, it may receive an HTTP request 302 from client A, generate log data regarding the request, and forward the request on to endpoint C (e.g., if authorized). Similarly, endpoint C may send response 304 to intermediary device I, which then generates corresponding log data, and may forward the response on to client A.

The web traffic log data captured by intermediary device I may include traffic information regarding the web traffic such as, but not limited to, source and/or destination address information (e.g., the network address of client A, the network address of endpoint C, etc.), port information (e.g., port 80 in the case of HTTP traffic, etc.), protocol information, timing information (e.g., when a given HTTP request 302 was sent, etc.), packet information (e.g., packet size information, packet length information, etc.), and the like. Web traffic log data may also include, in various embodiments, information available from any or all of the fields in the HTTP headers of the web traffic. For example, such header information may include the Uniform Resource Identifier (URI) of endpoint C such as a Uniform Resource Locator (URL), an HTTP cookie, user-agent information, content type information, and any other information that may be conveyed via HTTP headers.

In this manner, intermediate device I may capture web traffic log data regarding web traffic between any number of clients (e.g., client device B in local network 110, etc.) and any number of endpoints. Even a single webpage visit by client A may entail a plurality of web traffic exchanges with different endpoints to load media files, as a result of a redirect, as a result of the execution of a webpage script, etc. In other words, intermediate device I may collect web traffic log data regarding a diverse number of clients and endpoints through its operation.

As shown in FIG. 3B, intermediate device I, or another device in communication therewith, may analyze the captured web traffic log data to associate a known user ID with the address of client A. Notably, certain HTTP header fields of web traffic may include or indicate a known user ID that is used in the network. By leveraging these user IDs, the analyzing device may determine that a particular one of the user IDs can be found in web traffic associated with a particular client address and associate the two, accordingly. In some embodiments, such an association may be based on multiple observed traffic flows (e.g., to reduce false positives, etc.).

By way of example, consider the user ID (e.g., username) Vice' that is assigned to the user of client A. Example web traffic log data associated with client A may then include the following HTTP header information, with emphasis added on the included user ID:

"uri":"/datashared/user/preferences/framework/a/l/i/alice.json?noCacheIE=1453850395816&",
"uri":"/datashared/user/profile/a/l/i/alice.json?noCacheIE=1453850395819 &",
"uri":"/pcgbin/framework/3.2.0/user/get_user_prefs.cgi?uid=alice&_dc=1453850386446&callback=stcCallback1001",
"Cookie":
"CP_GUTC=123.45.678.99.1409685494634088; v1st=65328D88394E0B3B;_utma=152635051.1249208069.1419013680.1419013680.1419013680.1; cec_user_id=alice; cec_cn=alice; ObSSOCookie=W5ZAndeXQEBzos95AduStgVMsdGgvDy7GJiOkmFE wf%2CpMVyrGEN6NxgC8x%2FbXxTeMlZ-B1U3rgyJee3ohRHQLHJ% 2BvYJ%2Bfa%2BiEgU-RAfBtbbB8O4zdfIpWcltrJA%2BWODVOwOmE j4xUpe8c3ZBBeofOOfBR3FsqAixYtj8WgLRF71I-YX3wEFWVXCZDA LycSivVHdr407krnFAO7foN4-E1zoO1aAFZjxAHntagcy%2BIS%2RjuA BkKDG5y-CabXeKPK69XwAv76dcW15MR4Ae5U8X2%2F5-1SfgkfWR BmVM2p2wEq5tu8%2FZqb8ZC6IhK-FjZejIif5thv6DzISdPqilr8ces8d %2 BoAKDG% 2Cie5SPgE2s%2FOde8Vu0mw8%3D; authorization=Employee;cdcSsoTimer=idleTimer%3D14-56764991568%26resynchInterval%3D145675233-1568; FOO-Loc=www2.foo.test", In other words, as shown above, a known user ID in a network may appear in the HTTP header fields as part of their string values. By parsing these fields, the analyzing device can then match the user ID to that of the client address associated with the web traffic in which the header fields appear.

Figure 4:
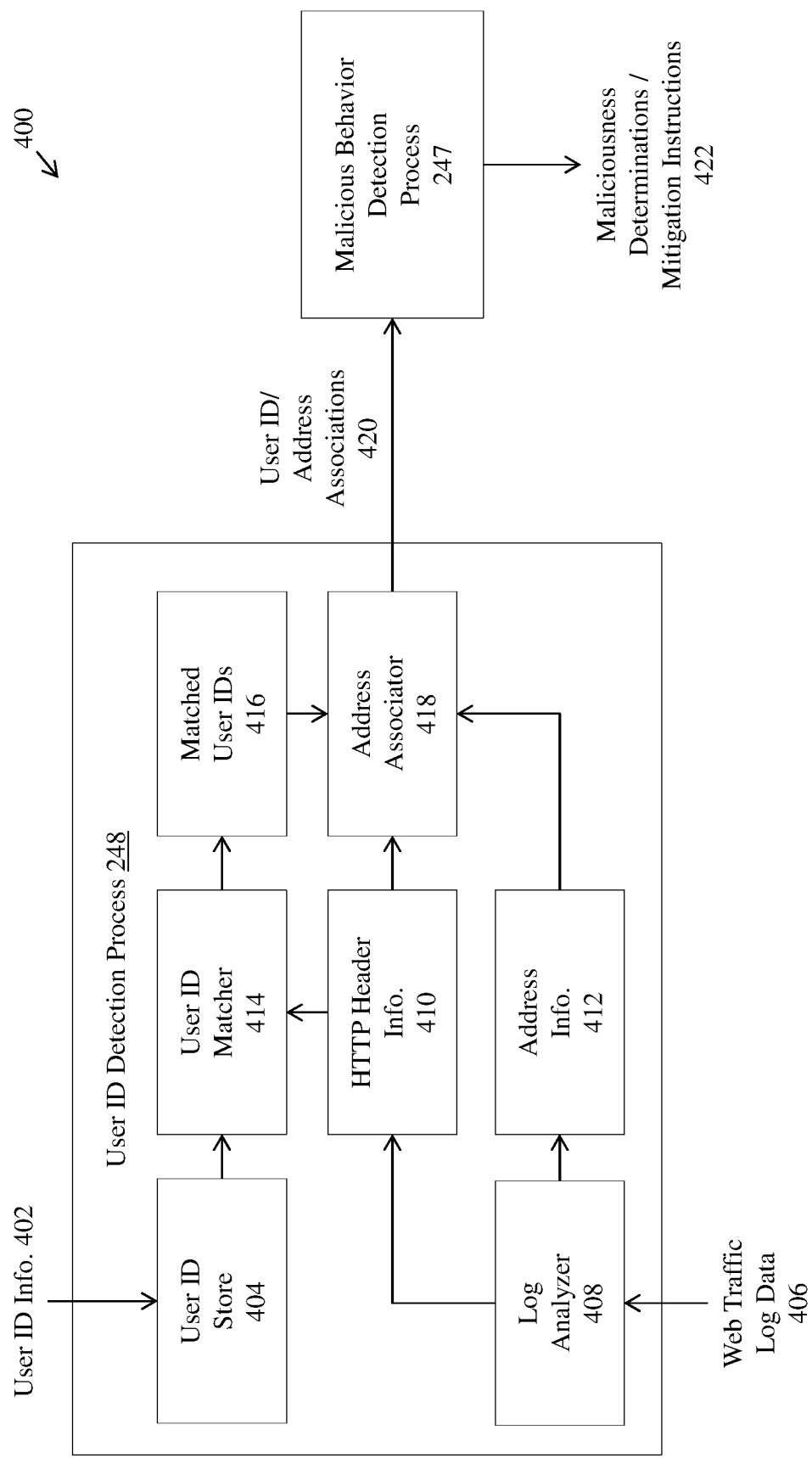
FIG. 4 illustrates an example architecture for associating a user identifier detected from web traffic with a client address.

FIG. 4 illustrates an example architecture 400 for associating a user identifier detected from web traffic with a client address, according to various embodiments. As shown, user ID detection process 248 may include any number of sub-processes and access any number of data storage locations either locally on a single device or across multiple devices in a distributed manner. Additionally, while specific sub-processes and data storage locations are shown in architecture 400, any number of different implementations are possible using the techniques herein (e.g., by combining the functions of the sub-processes shown, by having one sub-process perform the functions of another sub-process shown, etc.).

In various embodiments, user ID detection process 248 may receive user ID information 402 regarding any or all of the set of user IDs of the organization. These may be, for example, usernames for an email application or another application in use, logon usernames, or any other user ID that is typically available to an administrator. For example, user ID information 402 may be retrieved from a Lightweight Directory Access Protocol (LDAP) directory by executing a retrieval script. User ID detection process 248 may then store the received user ID information 402 in user ID store 404 for further processing or, alternatively, access the remote directory with this information on demand.

In some cases, user ID information 402 may also include contact details for the corresponding users such as phone numbers, postal addresses, internal building locations, etc. This contact information can be leveraged to contact the user, such as in the case when malicious behavior is detected in the network (e.g., the user's device is suspected of being infected with malware, etc.).

User ID detection process 248 may also receive web traffic log data 406 regarding any number of web traffic flows in the network between any number of client/endpoint devices. Web traffic log data 406 may be captured locally by the device executing user ID detection process 248 or one or more other devices in the network configured to do so. As noted above, web traffic log data 406 may include any or all information that can be captured by the system through the analysis of the packets of the web traffic flows (e.g., the addresses involved, HTTP header information, etc.). In general, the set of user IDs in user ID store 404 should be refreshed periodically or on demand, to account for newly added or changed user IDs.

In some embodiments, user ID detection process 248 may include a log analyzer 408 configured to analyze the received web traffic log data 406. More specifically, log analyzer 408 may extract out the address information 412 associated with the web traffic flows and the HTTP header information 410 captured from these flows. For any given web traffic flow, address information 412 may include the network address of the client, timing information (e.g., when the traffic was generated), the address of the other endpoint, port information, or any other information that associates the particular client address and traffic flow to the corresponding HTTP header information 410 captured from that flow.

As noted above, HTTP header information 410 may include any or all header field values in the HTTP header (or other available header) of the web traffic. For example, HTTP header information 410 may include, but is not limited to, any cookies included in the header, URI/URL information present in the header, or any other string that may have a user ID embedded therein.

According to various embodiments, user ID detection process 248 may include a user ID matcher 414 configured to match user IDs in user ID store 404 to user IDs present in HTTP header information 410. For example, given an HTTP URI, cookie, etc. in HTTP header information 410, user ID matcher 414 may check to see if any of the user IDs in user ID store 404 appear as a substring in the URI, cookie, etc. In further cases, the techniques herein may also apply to other protocol headers in which a user ID may appear.

In one embodiment, if there are overlapping matches between two or more strings in user ID store 404 and HTTP header information 410, user ID matcher 414 may only count the longest match and discard any shorter match. For example, for each matching user identifier U, user ID matcher 414 may check the characters in the URI adjacent to the matching string to see if they are delimiters such as the characters '?', '&', '/', '-', '\\', '_', '.', '=', ';' or the beginning or end of the string. If there are, user ID matcher 414 may logically associate the user identifier U with the HTTP session/traffic flow and store this association in matched user IDs 416. The checking performed by user ID matcher 414 can be performed efficiently using a multiple string matching methodology, such as Aho-Corasick.

In some cases, user ID matcher 414 may be configured to operate in an 'online' mode, such as when user ID matcher 414 is executed by the intermediary device that monitors the traffic (e.g., to assess the current web traffic in the network). In further cases, user ID matcher 414 may be configured to operate in an 'offline' mode using data received from a flow monitoring/collection system and then processing the headers and addresses to determine the mapping when and if this information is needed. In the online case, the user ID can be included in a flow record, and in the offline case, the flow monitoring system can include the HTTP URI in the flow record, to be processed offline.

User ID detection process 248 may also include an address associator 418 used to associate matched user IDs 416 with a corresponding client address from address information 412, according to various embodiments. In some cases, address associator 418 may use an adaptation of the term frequency-inverse document frequency (TF-IDF) methodology, to associate the matched user IDs with the addresses. For example, address associator 418 may calculate the frequency of user IDs from matched user IDs 416 across all the URIs/URLs, cookies, etc., regardless the address. In other words, address associator 418 may assign a weighting/ranking to each of the matched user IDs 416 based on their frequency across any or all of the web traffic and regardless of the client addresses. Then, when address associator 418 calculates the frequency of the matched user IDs 416 for a particular address, it may adjust the importance ranking of the user IDs accordingly. In turn, address associator 418 may associate the particular address with the particular user ID that has the highest frequency of appearance and adjusted by the importance ranking. In other words, the importance ranking is lower for more common user IDs and higher for less common ones.

The above frequency analysis and importance rankings of the user IDs may help to reduce false positives. In particular, it may happen that a given user ID appears in a URI, but is not actually associated with the address involved in the flow. For example, assume that Bob, with username "bob" searches for "alice" in a corporate director. In such a case, the captured URIs may appear as follows:

http://search.directory.company.test/display?pos=1&pid=Let%20Search%20Deci de&websessionid=92E86-25C785F99367C4C48185C5A54B0&requestId=26902-46892747438_92E8625C785F99367C4C48185C5-A54B0_bob_123.45.67.8&mdsQ=&query=alic e&src=DIRECTORY&uid=bob&queryId=1&filter-Change=default&reporder=1&url=htt p://wwwin-tools.company.test/dir/details/alice This search result includes both the user ID 'bob' (the true positive) twice, but it also includes 'alice' twice (a false positive), as well. If Bob visits the internal site http://wwwin-tools.company.test/dir/details/alice then the only match in the URI is a false positive. Thus, the 'majority logic' across multiple sessions described above may help to prevent false positives from confusing the system when URIs are being parsed. Of note also is that false positives of this type are much less likely in HTTP cookies than in URIs and, in some embodiments, address associator 418 may take advantage of this fact by giving a higher weight to matched user IDs 416 that appear in cookies and use a voting scheme that takes those weights into account when associating a particular user ID with a particular client address.

The inverse document frequency approach above also helps to curb false positives that may arise as the result of users having IDs that are terms that commonly appear in URIs, cookies, etc., and/or that are common English words. For example, if there is a user ID in user ID store 404 called "id" or "search," which is more common than one would expect, then it will be frequently matched in many URIs and cookies of many traffic flows, which would lead to a wrong decision if a simple frequency count was used. The inverse document frequency term, however, will help to identify this as noise and will diminish the probability of assigning this user ID to an address, making it more likely for other identifiers that are less common among users to be assigned.

In some cases, address associator 418 may also take into account Dynamic Host Configuration Protocol (DHCP) information from the network monitoring system. Notably, a given network address may only be leased to a given client for a period of time. Thus, address associator 418 may associate a particular user ID with a particular address during the timespan between DHCP lease events and potentially remove the association based on the events (e.g., when the address of the client changes).

As would be appreciated, the ability to associate a user ID with a particular client address by analyzing web traffic may have any number of uses within the network. For example, a system that analyzes sessions or flows for malicious behavior can incorporate this information into their flow processing. This information can also be used for administrative purposes and/or as part of an intrusion detection system. For example, user ID detection process 248 may provide the user ID/address associations 420 to malicious behavior detection process 247 which can use this information to perform user-based behavioral analytics for a particular user/client or set of users/clients. In another example, malicious behavior detection process 247 may use the associations 420 for purposes of contacting a given user, if malicious behavior is detected.

Using the associations 420, malicious behavior detection process 247 may generate maliciousness determinations and/or mitigation instructions 422. For example, if malicious behavior detection process 247 detects malicious behavior in a given traffic flow or session, it may include the corresponding user information in an alert or instruction regarding the detected behavior. As would be appreciated, mitigation actions may include generating an alert, blocking or flagging certain network traffic, or the like.

Figure 5:
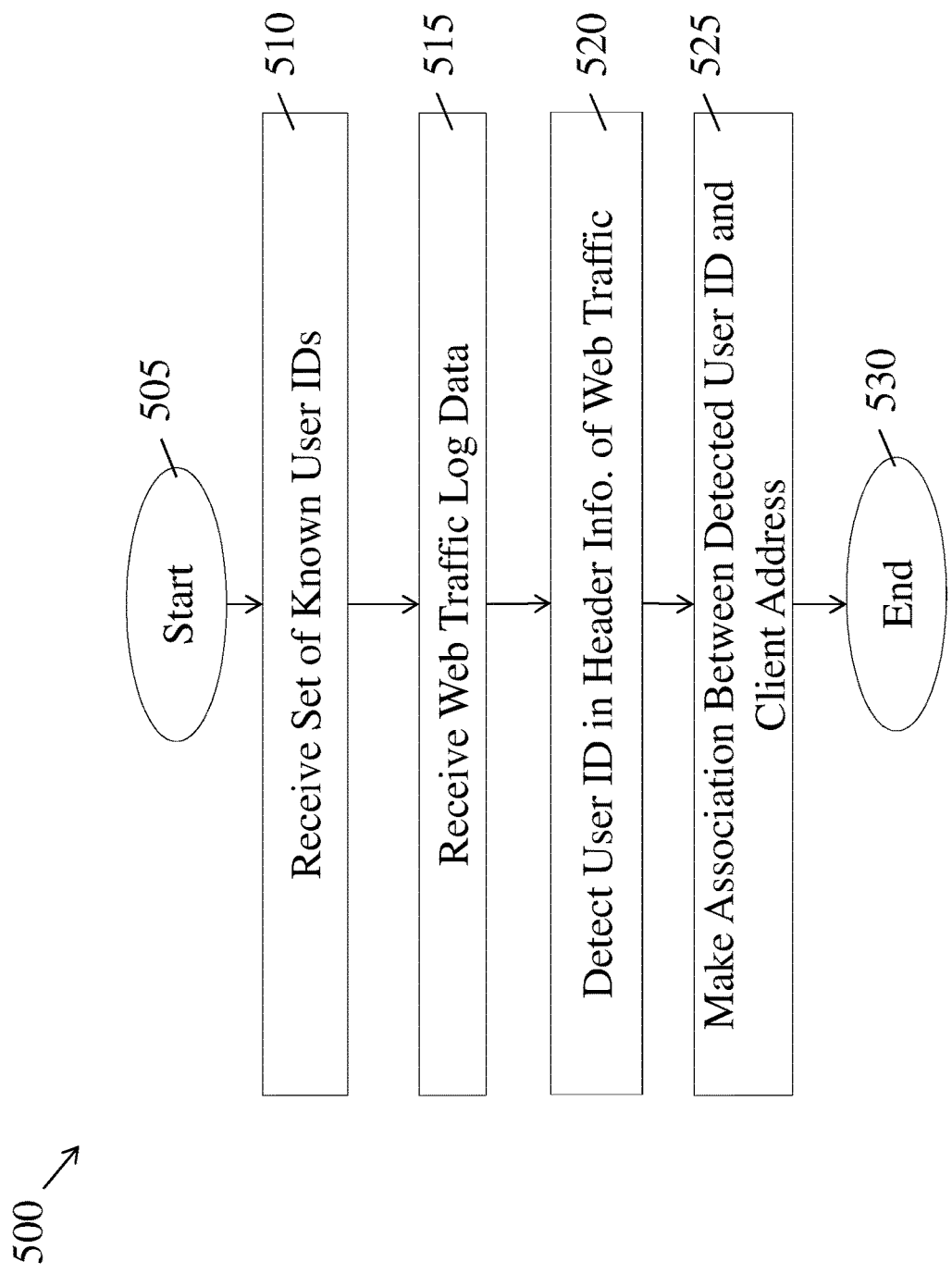
FIG. 5 illustrates an example simplified procedure for associating a user identifier from web traffic with a client address.

FIG. 5 illustrates an example simplified procedure for associating a user identifier from web traffic with a client address, in accordance with one or more embodiments described herein. For example, a non-generic, specifically configured device (e.g., device 200) may perform procedure 500 by executing stored instructions (e.g., process 248). The procedure 500 may start at step 505, and continues to step 510, where, as described in greater detail above, the device may receive a set of known user identifiers used in the network. For example, the device may receive the user IDs from an LDAP directory or other database of known user IDs (e.g., as assigned by the organization of the network).

At step 515, as detailed above, the device may receive web traffic log data regarding web traffic in the network. The web traffic log data may include header information captured from the web traffic (e.g., HTTP header information, etc.) and a plurality of client addresses associated with the various web traffic. In some cases, the device may capture this log data itself, such as when the device is an HTTP proxy or other intermediary device for the web traffic. In other cases, the device may receive the log data from a monitoring system deployed in the network.

At step 520, the device may detect a particular one of the set of known user identifiers in the header information captured from the web traffic associated with a particular one of the plurality of client addresses, as described in greater detail above. For example, in the case of web traffic associated with the address of client A, which is operated by Alice who has a user ID of 'alice,' the device may assess the HTTP headers of the web traffic (e.g., the URIs, the cookies, etc.) and detect the presence of 'alice' in the string(s).

At step 525, as detailed above, the device may make an association between the particular detected user ID and particular client address from step 520. In some cases, the device may do so based on a frequency or TF-IDF weighting assigned to the particular user ID and to any other user IDs appearing in the web traffic of the particular address. In further embodiments, the device may also base the association in part on the frequency, TF-IDF, etc. of these user IDs across any or all of the other web traffic in the network (e.g., web traffic associated with other client addresses). Doing so may help to reduce false positives in the association. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a simplified mechanism to associate user IDs with clients that does not require integration with login systems. If Network Address Translation (NAT) is being used on the network, then the information obtained by the techniques herein may even be better than these approaches since the techniques herein associate the addresses that are observable at the monitoring point with the user identifiers. The user ID associations using the techniques herein also do not require dynamic updates from a logon service, yet can still provide accurate information even when enterprise logs are partly outdated or inaccurate.

While there have been shown and described illustrative embodiments that provide for the association of a user ID with a network address, it is to be understood that various other adaptations and modifications may be made within the spirit and scope of the embodiments herein. For example, while certain embodiments are described herein with respect to using certain models for purposes of detecting malicious behavior, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device in a network, a set of known user identifiers used in the network;
   receiving, at the device, web traffic log data regarding web traffic in the network, wherein the web traffic log data comprises header information captured from the web traffic and a plurality of client addresses associated with the web traffic;
   detecting, by the device, a plurality of the known user identifiers in the header information associated with a particular one of the plurality of client addresses;
   selecting, by the device, a particular user identifier from the plurality of known user identifiers in the header information for association with the particular client address based on weightings assigned to the plurality of known user identifiers, wherein the weightings are based in part on frequency counts of the plurality of known user identifiers in the header information associated with the particular client address; and
   making, by the device, an association between the particular user identifier and the particular client address.

2. The method as in claim 1, further comprising:
   providing, by the device, the association to a malicious behavior detector to generate a model of network traffic behaviors on a per-user basis,
   wherein the malicious behavior detector performs a mitigation action in the network based on an output from the model of network traffic behaviors on a per-user basis.

3. The method as in claim 1, wherein receiving the set of known user identifiers used in the network comprises:
   receiving, by the device, the set of known user identifiers from a Lightweight Directory Access Protocol (LDAP) directory.

4. The method as in claim 1, wherein detecting the plurality of known user identifiers in the header information associated with the particular client address comprises:
   identifying, by the device, the plurality of known user identifiers in a Uniform Resource Identifier (URI) or a cookie in the header information associated with the particular client address.

5. The method as in claim 1, further comprising:
   removing, by the device, the association between the particular user identifier and the particular client address based on a Dynamic Host Configuration Protocol (DHCP) event involving the particular client address.

6. An apparatus, comprising:
   one or more network interfaces to communicate with a network;
   a processor coupled to the network interfaces and configured to execute one or more processes; and
   a memory configured to store a process executable by the processor, the process when executed operable to:
   receive a set of known user identifiers used in the network;
   receive web traffic log data regarding web traffic in the network, wherein the web traffic log data comprises header information and a plurality of client addresses associated with the web traffic;

detect a plurality of the known user identifiers in the header information associated with a particular one of the plurality of client addresses;

select a particular user identifier from the plurality of known user identifiers in the header information for association with the particular client address based on weightings assigned to the plurality of known user identifiers, wherein the weightings are based in part on frequency counts of the plurality of known user identifiers in the header information associated with the particular client address; and make an association between the particular user identifier and the particular client address.

7. The apparatus as in claim 6, wherein the process when executed is further operable to:

provide the association to a malicious behavior detector to generate a model of network traffic behaviors on a per-user basis, wherein the malicious behavior detector performs a mitigation action in the network based on an output from the model of network traffic behaviors on a per-user basis.

8. The apparatus as in claim 6, wherein the apparatus receives the set of known user identifiers used in the network by:

receiving the set of known user identifiers from a Lightweight Directory Access Protocol (LDAP) directory.

9. The apparatus as in claim 6, wherein the apparatus detects the plurality of known user identifiers in the header information associated with the particular client address by:

identifying the plurality of known user identifiers in a Uniform Resource Identifier (URI) or a cookie in the header information associated with the particular client address.

10. The apparatus as in claim 6, wherein the process when executed is further operable to:

remove the association between the particular user identifier and the particular client address based on a Dynamic Host Configuration Protocol (DHCP) event involving the particular client address.

11. A tangible, non-transitory, computer-readable medium storing program instructions that cause a device in a network to execute a process comprising:

receiving, at the device, a set of known user identifiers used in the network;

receiving, at the device, web traffic log data regarding web traffic in the network, wherein the web traffic log data comprises header information and a plurality of client addresses associated with the web traffic;

detecting, by the device, a plurality of the known user identifiers in the header information associated with a particular one of the plurality of client addresses;

selecting, by the device, a particular user identifier from the plurality of known user identifiers in the header information for association with the particular client address based on weightings assigned to the plurality of known user identifiers, wherein the weightings are based in part on frequency counts of the plurality of known user identifiers in the header information associated with the particular client address; and making, by the device, an association between the particular user identifier and the particular client address.

12. The tangible, non-transitory, computer-readable medium as in claim 11, wherein detecting the plurality of known user identifiers in the header information associated with the particular client address comprises:

identifying the plurality of known user identifiers in a Uniform Resource Identifier (URI) or a cookie in the header information captured associated with the particular client address.

13. The tangible, non-transitory, computer-readable medium as in claim 11, wherein the process further comprises:

providing, by the device, the association to a malicious behavior detector to generate a model of network traffic behaviors on a per-user basis, wherein the malicious behavior detector performs a mitigation action in the network based on an output from the model of network traffic behaviors on a per-user basis.

14. The tangible, non-transitory, computer-readable medium as in claim 11, wherein receiving the set of known user identifiers used in the network comprises:

receiving the set of known user identifiers from a Lightweight Directory Access Protocol (LDAP) directory.

15. The tangible, non-transitory, computer-readable medium as in claim 11, wherein detecting the plurality of known user identifiers in the header information associated with the particular client address comprises:

identifying the plurality of known user identifiers in a Uniform Resource Identifier (URI) or a cookie in the header information associated with the particular client address.

16. The tangible, non-transitory, computer-readable medium as in claim 11, wherein the process further comprises:

removing the association between the particular user identifier and the particular client address based on a Dynamic Host Configuration Protocol (DHCP) event involving the particular client address.

* * * * *

UNITED STATES PATENT AND TRADEMARK OFFICE
CERTIFICATE OF CORRECTION

| | | |
|---|---|---|
| PATENT NO. | : 11,394,728 B2 | Page 1 of 1 |
| APPLICATION NO. | : 16/432400 | |
| DATED | : July 19, 2022 | |
| INVENTOR(S) | : David McGrew et al. | |

It is certified that error appears in the above-identified patent and that said Letters Patent is hereby corrected as shown below:

In the Specification

Column 7, Line 24, please amend as shown:
'alice' that is assigned to the user of client A. Example web Column 9, Line 53, please amend as shown:
1&pid=Let%20Search%20Decide&websessionid=92E86-

Column 9, Line 58, please amend as shown:
Change=default&reporder=1&url=http://wwwin-tools.

Signed and Sealed this
Eleventh Day of October, 2022

Katherine Kelly Vidal
*Director of the United States Patent and Trademark Office*